(12) United States Patent
Amin et al.

(10) Patent No.: US 12,404,207 B2
(45) Date of Patent: *Sep. 2, 2025

(54) TEXTURED, ANTIGLARE GLASS ARTICLES AND METHODS OF MAKING THE SAME

(71) Applicant: CORNING INCORPORATED, Corning, NY (US)

(72) Inventors: Jaymin Amin, Corning, NY (US); Yuhui Jin, Painted Post, NY (US); Karl William Koch, III, Elmira, NY (US); Aize Li, Painted Post, NY (US); David Lee Weidman, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,878

(22) Filed: Jun. 4, 2024

(65) Prior Publication Data
US 2024/0317639 A1    Sep. 26, 2024

Related U.S. Application Data

(63) Continuation of application No. 17/015,668, filed on Sep. 9, 2020, now Pat. No. 12,030,805.
(Continued)

(51) Int. Cl.
*C03C 15/00* (2006.01)
*C03C 3/091* (2006.01)
*C03C 19/00* (2006.01)

(52) U.S. Cl.
CPC .............. *C03C 15/00* (2013.01); *C03C 3/091* (2013.01); *C03C 19/00* (2013.01); *C03C 2204/00* (2013.01); *C03C 2204/08* (2013.01)

(58) Field of Classification Search
CPC ...... C03C 15/00; C03C 2204/00; C03C 19/00
(Continued)

(56) References Cited

U.S. PATENT DOCUMENTS

2005/0211673 A1    9/2005  Kurachi et al.
2009/0214828 A1*   8/2009  Watkins ............... G02B 6/0053
                                                         428/156
(Continued)

FOREIGN PATENT DOCUMENTS

CN    102869629 A    1/2013
CN    104661976 A    5/2015
(Continued)

OTHER PUBLICATIONS

Chinese Patent Application No. 202080068981.7, Office Action dated Aug. 12, 2023, 4 pages (English Translation only), Chinese Patent Office.
(Continued)

*Primary Examiner* — Tahseen Khan
(74) *Attorney, Agent, or Firm* — William J. Tucker

(57) ABSTRACT

A glass article is provided that includes: a glass substrate comprising a thickness and a primary surface; and a textured region defined by the primary surface. The textured region comprises a low spatial frequency region and a high spatial frequency region substantially superimposed within the low spatial frequency region. Further, the low spatial frequency region comprises an average lateral feature size that exceeds an average lateral feature size of the high spatial frequency region. In addition, the textured region comprises a surface roughness ($R_a$) from about 10 nm to about 1000 nm.

26 Claims, 8 Drawing Sheets

Related U.S. Application Data

(60) Provisional application No. 62/897,620, filed on Sep. 9, 2019.

(58) Field of Classification Search
USPC .......................................................... 428/156
See application file for complete search history.

(56) References Cited

U.S. PATENT DOCUMENTS

| | | | |
|---|---|---|---|
| 2012/0218640 A1* | 8/2012 | Gollier | C03C 15/00 |
| | | | 359/601 |
| 2012/0300307 A1* | 11/2012 | Borrelli | G02B 5/0278 |
| | | | 359/609 |
| 2013/0273324 A1 | 10/2013 | Moll et al. | |
| 2014/0049822 A1* | 2/2014 | Gollier | G02B 5/0294 |
| | | | 359/488.01 |
| 2015/0174625 A1 | 6/2015 | Hart et al. | |
| 2018/0185875 A1 | 7/2018 | Murakami et al. | |
| 2018/0224578 A1* | 8/2018 | Kajiya | G02B 1/118 |
| 2018/0282201 A1* | 10/2018 | Hancock, Jr. | C03C 17/32 |
| 2019/0248702 A1 | 8/2019 | Lee et al. | |
| 2022/0196884 A1 | 6/2022 | Kajiya et al. | |

FOREIGN PATENT DOCUMENTS

| | | |
|---|---|---|
| CN | 106030348 A | 10/2016 |
| CN | 107129160 A | 9/2017 |
| CN | 110156337 A | 8/2019 |
| TW | 201042295 A | 12/2010 |
| TW | 201104290 A | 2/2011 |
| TW | 201137409 A | 11/2011 |
| TW | 201300846 A | 1/2013 |
| TW | 201534990 A | 9/2015 |
| TW | 201639687 A | 11/2016 |
| TW | 201716806 A | 5/2017 |
| WO | 2010/117673 A1 | 10/2010 |
| WO | 2014/192901 A1 | 12/2014 |
| WO | 2016/040151 A1 | 3/2016 |
| WO | 2016/138051 A1 | 9/2016 |
| WO | 2018/140581 A1 | 8/2018 |
| WO | 2018/182996 A1 | 10/2018 |
| WO | 2020/060955 A1 | 3/2020 |

OTHER PUBLICATIONS

International Search Report and Written Opinion of the International Searching Authority; PCT/US2020/049863; Mailed Jan. 18, 2021; 18 Pages; European Patent Office.

Invitation to Pay Additional Fees of the International Searching Authority; PCT/US2020/049863; Mailed Nov. 16, 2020; 16 Pages; European Patent Office.

Taiwanese Patent Application No. 109130934, Office Action dated Jan. 22, 2023, 3 pages (English Translation only), Taiwanese Patent Office.

* cited by examiner

TEXTURED, ANTIGLARE GLASS ARTICLES AND METHODS OF MAKING THE SAME

CLAIM OF PRIORITY

This application is a continuation application of U.S. application Ser. No. 17/015,668, filed Sep. 9, 2020, and issued as U.S. Pat. No. 12,030,805 on Jul. 9, 2024, which claims the benefit of priority under 35 U.S.C. § 119 of U.S. Provisional Application Ser. No. 62/897,620, filed on Sep. 9, 2019, the content of these documents are relied upon and incorporated herein by reference in its entirety.

FIELD

The present disclosure generally relates to textured, antiglare glass articles and methods of making the same, particularly textured glass articles with low sparkle and distinctness of image (DOI) characteristics.

BACKGROUND

Antiglare surfaces are often used in display devices such as LCD screens, tablets, smartphones, OLEDs and touch screens to avoid or reduce specular reflection of ambient light. In many display devices, these antiglare surfaces are formed by providing a level of roughness to one or more surfaces of the glass to spread and scatter incident light. Antiglare surfaces in the form of a roughened glass surface are often used on the front surfaces of these display devices to reduce the apparent visibility of external reflections from the display and improve readability of the display under differing lighting conditions.

Display "sparkle" or "dazzle" is a phenomenon that can occur when antiglare or light scattering surfaces are incorporated into a display system. Sparkle is the expression of a non-uniform pixel light intensity distribution. Further, sparkle is associated with a very fine grainy appearance that can appear to have a shift in the pattern of the grains with changing viewing angle of the display. This type of sparkle is observed when pixelated displays, such as LCDs, are viewed through an antiglare surface. As the resolution of display devices continues to increase, particularly for hand-held electronic devices, the pixel pitch of the array of pixels employed in these devices continues to decrease, exacerbating unwanted sparkle effects.

Conventional approaches to making textured, antiglare glass surfaces have been successful at producing surfaces with good antiglare properties. However, these textured, antiglare surfaces have exhibited high degrees of sparkle. Common surface treatments and other processes aimed at reducing sparkle tend to successfully reduce sparkle, but at the expense of antiglare properties, such as DOI.

In view of these considerations, there is a need for textured glass surfaces and articles with a combination of low sparkle and low DOI characteristics. There is also a need for methods of making such surfaces and articles that are amenable to manufacturing at low cost and high throughput.

SUMMARY

According to an aspect of the disclosure, a glass article is provided that includes: a glass substrate comprising a thickness and a primary surface; and a textured region defined by the primary surface. The textured region comprises a low spatial frequency region and a high spatial frequency region substantially superimposed within the low spatial frequency region. Further, the low spatial frequency region comprises an average lateral feature size that exceeds an average lateral feature size of the high spatial frequency region. In addition, the textured region comprises a surface roughness ($R_a$) from about 10 nm to about 1000 nm.

According to an aspect of the disclosure, a glass article is provided that includes: a glass substrate comprising a thickness and a primary surface; and a textured region defined by the primary surface. The textured region comprises a low spatial frequency region and a high spatial frequency region. The low spatial frequency region comprises an average lateral feature size that exceeds an average lateral feature size of the high spatial frequency region. Further, the textured region comprises a surface roughness ($R_a$) from about 10 nm to about 1000 nm. In addition, the glass article comprises a sparkle of less than 3% as measured by pixel power distribution (PPD) and a distinctness of image (DOI) of less than 70%.

According to another aspect of the disclosure, a method of making a glass article is provided that includes: a first etching of a primary surface of a glass substrate with a first etchant to form a low spatial frequency textured region defined by the primary surface; and a second etching of the primary surface of the glass substrate with a second etchant to form a high spatial frequency textured region defined by the primary surface and substantially superimposed within the low spatial frequency textured region. The low spatial frequency textured region comprises an average lateral feature size that exceeds an average lateral feature size of the high spatial frequency region. Further, the textured region comprises a surface roughness ($R_a$) from about 10 nm to about 1000 nm.

According to a first aspect of the disclosure, a glass article is provided that includes: a glass substrate comprising a thickness and a primary surface; and a textured region defined by the primary surface. The textured region comprises a low spatial frequency region and a high spatial frequency region substantially superimposed within the low spatial frequency region. Further, the low spatial frequency region comprises an average lateral feature size that exceeds an average lateral feature size of the high spatial frequency region. In addition, the textured region comprises a surface roughness ($R_a$) from about 10 nm to about 1000 nm.

According to a second aspect, the glass article of the first aspect is provided, wherein the average lateral feature size of the low spatial frequency region is about 5 µm or larger and the average lateral feature size of the high spatial frequency region is less than 5 µm.

According to a third aspect, the glass article of the first aspect is provided, wherein the average lateral feature size of the low spatial frequency region is about 10 µm or larger and the average lateral feature size of the high spatial frequency region is less than 5 µm.

According to a fourth aspect, the glass article of the first aspect is provided, wherein the average lateral feature size of the low spatial frequency region is about 20 µm or larger and the average lateral feature size of the high spatial frequency region is less than 5 µm.

According to a fifth aspect, the glass article of any one of the first through the fourth aspects is provided, wherein the surface roughness ($R_a$) of the textured region comprises a low spatial frequency component ($R_{a1}$) in the low spatial frequency region and a high spatial frequency component ($R_{a2}$) in the high spatial frequency region, and further wherein $R_{a1}$ is from 10 nm to 1000 nm and $R_{a2}$ is from 10 nm to 200 nm.

According to a sixth aspect, the glass article of any one of the first through the fifth aspects is provided, wherein the glass substrate comprises a composition selected from the group consisting of an aluminosilicate glass, a borosilicate glass, a phosphosilicate glass, a soda lime glass, an alkali aluminosilicate glass, and an alkali aluminoborosilicate glass.

According to a seventh aspect, the glass article of any one of the first through sixth aspects is provided, wherein the glass substrate further comprises a compressive stress region that extends from the primary surface to a selected depth.

According to an eighth aspect of the disclosure, a glass article is provided that includes: a glass substrate comprising a thickness and a primary surface and a textured region defined by the primary surface. The textured region comprises a low spatial frequency region and a high spatial frequency region. The low spatial frequency region comprises an average lateral feature size that exceeds an average lateral feature size of the high spatial frequency region. The textured region comprises a surface roughness ($R_a$) from about 10 nm to about 1000 nm. Further, the glass article comprises a sparkle of less than 3% as measured by pixel power distribution (PPD) and a distinctness of image (DOI) of less than 70%.

According to a ninth aspect, the glass article of the eighth aspect is provided, wherein the glass article comprises a sparkle of less than 2% as measured by pixel power distribution (PPD) and a distinctness of image (DOI) of less than 60%.

According to a tenth aspect, the glass article of the eighth aspect is provided, wherein the glass article comprises a sparkle of less than 1% as measured by pixel power distribution (PPD) and a distinctness of image (DOI) of less than 50%.

According to an eleventh aspect, the glass article of any one of the eighth through tenth aspects is provided, wherein the glass article comprises a transmittance haze from about 3% to about 90%.

According to a twelfth aspect, the glass article of the eighth aspect is provided, wherein the glass article comprises a sparkle of less than 1% as measured by pixel power distribution (PPD).

According to a thirteenth aspect, the glass article of any one of the eighth through twelfth aspects is provided, wherein the high spatial frequency region is substantially superimposed within the low spatial frequency region.

According to a fourteenth aspect, the glass article of any one of the eighth through thirteenth aspects is provided, wherein the average lateral feature size of the low spatial frequency region is about 20 μm or larger and the average lateral feature size of the high spatial frequency region is less than 5 μm.

According to a fifteenth aspect of the disclosure, the method of making a glass article is provided that includes: a first etching of a primary surface of a glass substrate with a first etchant to form a low spatial frequency textured region defined by the primary surface; and a second etching of the primary surface of the glass substrate with a second etchant to form a high spatial frequency textured region defined by the primary surface and substantially superimposed within the low spatial frequency textured region. The low spatial frequency textured region comprises an average lateral feature size that exceeds an average lateral feature size of the high spatial frequency textured region. Further, the textured regions comprise a surface roughness ($R_a$) from about 10 nm to about 1000 nm.

According to a sixteenth aspect, the method of the fifteenth aspect is provided, wherein the first etchant comprises a sand blast etchant and a low pH solution etchant.

According to a seventeenth aspect, the method of the fifteenth aspect is provided, wherein the first etchant comprises hydrochloric acid and a fluoride salt, wherein the fluoride salt comprises one or more salts selected from the group consisting of ammonium fluoride, sodium fluoride, potassium fluoride, ammonium difluoride, sodium difluoride, and potassium difluoride.

According to an eighteenth aspect, the method of any one of the fifteenth through seventeenth aspects is provided, wherein the second etching is conducted at an etching temperature above ambient temperature and the second etchant is a solution with a pH of less than 4.

According to a nineteenth aspect, the method of any one of the fifteenth through eighteenth aspects is provided, wherein the second etchant comprises an acid selected from the group consisting of hydrochloric acid, nitric acid, sulfuric acid, citric acid, ascorbic acid, oxalic acid and acetic acid.

According to a twentieth aspect, the method of any one of the fifteenth through nineteenth aspects is provided, wherein the second etchant comprises one or more salts comprising a multivalent metal cation.

According to a twenty-first aspect, the method of any one of the eighteenth through twentieth aspects is provided, wherein the etching temperature of the second etching is from about 60° C. to about 100° C.

According to a twenty-second aspect, the method of any one of the fifteenth through twenty-first aspects is provided, further comprising treating the primary surface of the glass substrate with an aqueous solution having a pH of greater than 9 at a temperature above ambient temperature, the treating step conducted after the first and second etching steps.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
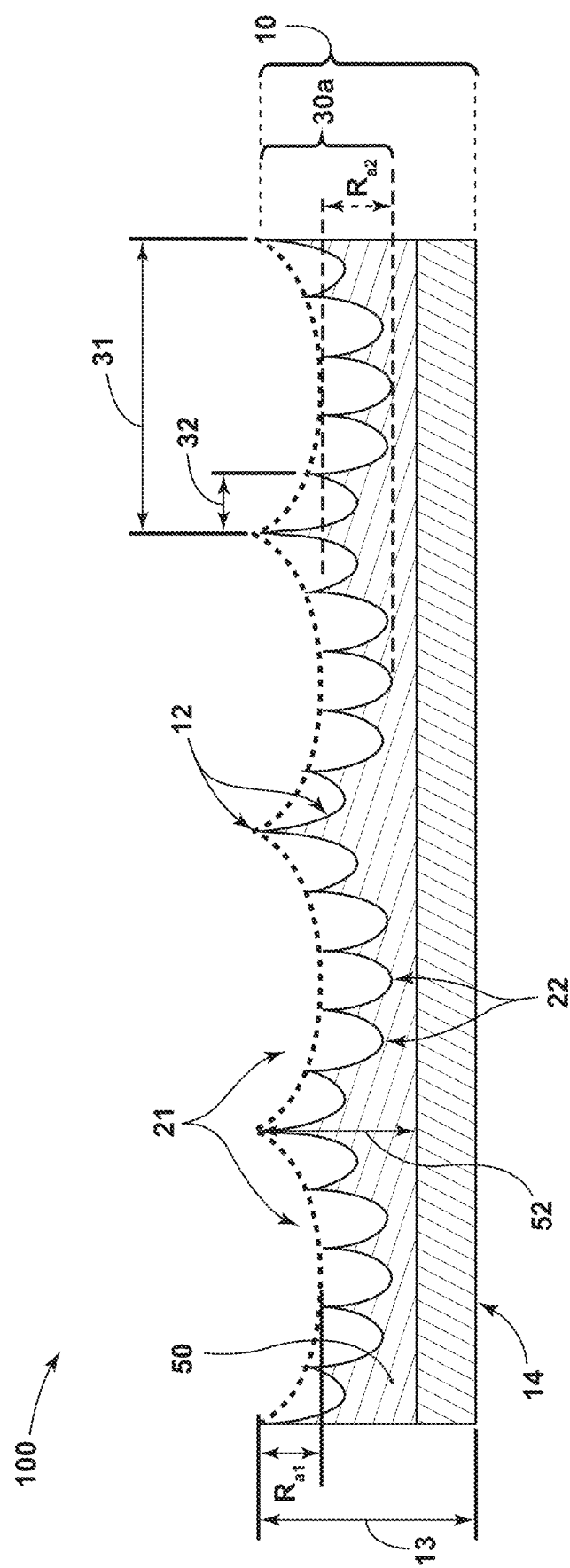
FIG. 1 is a cross-sectional, schematic view of a textured, antiglare glass article, according to an aspect of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Aspects of the disclosure generally pertain to textured, antiglare glass articles and, particularly, textured, antiglare glass articles with low sparkle and low distinctness of image (DOI). These antiglare glass articles have a textured region that includes a low spatial frequency region and a high spatial frequency textured region. Aspects of the disclosure include methods of making these articles. More generally, the approaches to preparing the textured, antiglare glass articles of the disclosure generate finely textured surfaces with hybrid low and high spatial frequency regions having average lateral feature sizes of greater than about 5 microns and less than about 5 microns, respectively, on multicomponent glass substrates.

Referring to FIG. 1, a textured, antiglare glass article 100 is depicted as including a glass substrate 10 with a plurality of primary surfaces 12 and 14, and a thickness 13. The glass article 100 also includes a textured region 30a, as defined by the primary surface 12. In some embodiments, the textured region 30a is formed from or otherwise part of the substrate 10, as shown in FIG. 1. In some implementations (not shown), the textured region 30a is defined by the primary surface 14. Further, in some implementations, the textured region 30a is defined by both of primary surfaces 12 and 14.

As also depicted in FIG. 1, the textured region 30a includes a low spatial frequency region 21 and a high spatial frequency region 22. In some embodiments, the high spatial frequency region 22 is superimposed within the low spatial frequency region 21. In other embodiments, the high spatial frequency region 22 overlaps with the low spatial frequency region 21 or stands apart from the low spatial frequency region 21. Referring again to FIG. 1, each of the low spatial frequency region 21 and the high spatial frequency region 22 of the textured region 30a includes a plurality of exposed features. The exposed features of the low spatial frequency region 21 have an average lateral feature size 31 and an average surface roughness, $R_{a1}$. The exposed features of the high spatial frequency region 22 have an average lateral feature size 32 and an average surface roughness, $R_{a2}$. Further, the average surface roughness, $R_a$, of the textured region 30a is a function of the average surface roughness values of the low and high spatial frequency regions 21 and 22, i.e., $R_{a1}$ and $R_{a2}$, respectively. In some embodiments of the textured, antiglare glass article 100 the average lateral feature size 31 of the low spatial frequency region 21 exceeds the average lateral feature size 32 of the high spatial frequency region 22. In other embodiments, the average lateral feature size 31 of the low spatial frequency region 21 are about the same or larger than the average lateral feature size 32 of the high spatial frequency region 22. Accordingly, the average lateral feature size 31 can be larger than the average lateral feature size 32 by a factor of 1, 1.5, 2, 2.5, 3, 3.5, 4, 4.5, 5, 6, 7, 8, 9, 10, 15, 20, 30, 40, 50, 60, 70, 80, 90, 100 and all factors between these values.

According to some implementations of the textured, antiglare glass article 100, the exposed features of the textured region 30a, including their average lateral feature sizes 31 and 32 and average surface roughness values ($R_{a1}$ and $R_{a2}$) of the low and high spatial frequency regions 21 and 22, respectively, are configured to reduce the level of sparkle and distinctness of image (DOI) associated with the article when it is employed in a display device. The average lateral feature sizes 31 and 32 are given by an average of the maximum dimension of a sampling of features associated with each of the respective low and high spatial frequency regions 21 and 22, respectively, of the textured region 30a, as measured according to analytical and statistical sampling techniques understood by those with ordinary skill in the field of this disclosure. With regard to analytical techniques, those with ordinary skill in the field of the disclosure may employ one or more analytical instruments to measure the average lateral feature sizes 31 and 32, e.g., an atomic force microscope (AFM) for particularly small features (e.g., <10 μm) and an interferometer for larger size features (e.g., >10 μm). With regard to statistical techniques, one with ordinary skill may obtain the average lateral feature sizes by taking an image of primary surface 12 and measuring the maximum dimension of a sampling of at least ten (10) features. In other instances, larger sample sizes can be employed, as judged appropriate by those skilled in the field of the disclosure to obtain statistically significant results. Accordingly, the terms "average lateral feature size" and "average maximum dimension" of each of the low and high spatial frequency regions 21 and 22 are used interchangeably in the disclosure. In some embodiments, at least some of the plurality of features of the low and high spatial frequency regions 21 and 22 have a peak and a valley. The "maximum dimension" of the exposed features is the greatest distance from one portion of a peak of a feature to another portion of the peak of the feature.

In embodiments of the textured, antiglare article 100, the average lateral feature size 31 of the low spatial frequency region 21 associated with the textured region 30a of the article 100 is about 5 microns or greater. According to some implementations, the average lateral feature size 31 of the low spatial frequency region 21 is about 2.5 microns or greater, 5 microns or greater, 10 microns or greater, 15 microns or greater, 20 microns or greater, and all average lateral feature sizes between or above these values. Further, the average lateral feature size 31 of the low spatial frequency region 21 can be about 100 microns, 90 microns, 80 microns, 70 microns, 60 microns, 50 microns, 40 microns, 30 microns, 20 microns, 10 microns, 5 microns, 1 micron, 0.5 microns, and all values between these values.

In embodiments of the textured, antiglare article 100, the average lateral feature size 32 of the high spatial frequency region 22 associated with the textured region 30a of the article 100 is about 5 microns or less. According to some implementations, the average lateral feature size 32 of the high spatial frequency region 22 is about 5 microns or less, 4 microns or less, 3 microns or less, 2 microns or less, 1 micron or less, and all average lateral feature sizes between or less than these values. Further, the average lateral feature size 32 of the high spatial frequency region 22 can be about 0.05 microns, 0.1 microns, 0.2 microns, 0.3 microns, 0.4 microns, 0.5 microns, 0.6 microns, 0.7 microns, 0.8 microns, 0.9 microns, 1 micron, 1.5 microns, 2 microns, 2.5 microns, 3 microns, 3.5 microns, 4 microns, 4.5 microns, 5 microns, and all values between these values.

Referring again to the textured region 30a associated with the textured, antiglare glass article 100 depicted in FIG. 1, the average surface roughness can be measured as surface roughness, $R_a$, using an interferometer or an AFM. As noted earlier, the average surface roughness, $R_a$, of the textured region 30a is a function of the average surface roughness values of the low and high spatial frequency regions 21 and 22, i.e., $R_{a1}$ and $R_{a2}$, respectively. An interferometer that can be employed for this purpose is a ZYGO® NEWVIEW™ 7300 Optical Surface Profiler manufactured by ZYGO® Corporation. As smaller surface roughness values are evident, particularly in the high spatial frequency region 22, an AFM can be employed to more accurately characterize the surface roughness. Unless otherwise noted, the surface roughness is reported as a mean surface roughness. In embodiments, the glass article 100 can employ a textured region 30a having an average surface roughness ($R_a$) from about 10 nanometers to about 1000 nanometers (nm). According to some implementations, the average surface roughness ($R_a$) associated with the textured region 30a is from about 10 nanometers to about 1000 nanometers, from about 10 nanometers to about 500 nanometers, from about 20 nanometers to about 1000 nanometers, from about 20 nanometers to about 500 nanometers, from about 50 nanometers to about 500 nanometers, and all values between these levels of surface roughness. For example, the average surface roughness ($R_a$) associated with the textured region 30a can be about 1000, 900, 800, 700, 600, 500, 400, 300, 200, 100, 50, 25, 10, 5, 1, 0.5, 0.1 nanometers, and all surface roughness values between these levels.

In embodiments of the textured, antiglare article 100, the average surface roughness ($R_{a1}$) of the low spatial frequency region 21 associated with the textured region 30a of the article 100 is from about 10 nanometers to about 1000 nanometers. According to some implementations, the average surface roughness ($R_{a1}$) of the low spatial frequency region 21 is about 10 nanometers or greater, 50 nanometers or greater, 100 nanometers or greater, 200 nanometers or greater, 300 nanometers or greater, 400 nanometers or greater, 500 nanometers or greater, and all average surface roughness ($R_{a1}$) between or above these values. Further, the average surface roughness ($R_{a1}$) of the low spatial frequency region 21 can be about 1000 nanometers, 900 nanometers, 800 nanometers, 700 nanometers, 600 nanometers, 500 nanometers, 400 nanometers, 300 nanometers, 200 nanometers, 100 nanometers, 50 nanometers, and all values between these values.

In embodiments of the textured, antiglare article 100, the average surface roughness ($R_{a2}$) of the high spatial frequency region 22 associated with the textured region 30a of the article 100 is from about 10 nanometers to about 200 nanometers. According to some implementations, the average surface roughness ($R_{a2}$) of the high spatial frequency region 22 is about 10 nanometers or greater, 20 nanometers or greater, 30 nanometers or greater, 40 nanometers or greater, 50 nanometers or greater, 60 nanometers or greater, 70 nanometers or greater, 80 nanometers or greater, 90 nanometers or greater, 100 nanometers or greater, 150 nanometers or greater, and all average surface roughness ($R_{a2}$) between or above these values. Further, the average surface roughness ($R_{a2}$) of the high spatial frequency region 22 can be about 200 nanometers, 150 nanometers, 100 nanometers, 90 nanometers, 80 nanometers, 70 nanometers, 60 nanometers, 50 nanometers, 40 nanometers, 30 nanometers, 20 nanometers, 10 nanometers, and all values between these values.

According to implementations of the textured, anti-glare glass article 100 depicted in FIG. 1, the article is characterized by a low level of sparkle. In general, the roughness associated with its exposed features of these articles can begin to act like a plurality of lenses that generates an image artifact called "sparkle". Display "sparkle" or "dazzle" is a generally undesirable side effect that can occur when introducing antiglare or light scattering surfaces into a pixelated display system such as, for example, an LCD, an OLED, touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

As used herein, the terms "pixel power deviation" and "PPD" refer to the quantitative measurement for display sparkle. Further, as used herein, the term "sparkle" is used interchangeably with "pixel power deviation" and "PPD." PPD is calculated by image analysis of display pixels according to the following procedure. A grid box is drawn around each LCD pixel. The total power within each grid box is then calculated from CCD camera data and assigned as the total power for each pixel. The total power for each LCD pixel thus becomes an array of numbers, for which the mean and standard deviation may be calculated. The PPD value is defined as the standard deviation of total power per pixel divided by the mean power per pixel (times 100). The total power collected from each LCD pixel by the eye simulator camera is measured and the standard deviation of total pixel power (PPD) is calculated across the measurement area, which typically comprises about 30×30 LCD pixels.

The details of a measurement system and image processing calculation that are used to obtain PPD values are described in U.S. Pat. No. 9,411,180 entitled "Apparatus and Method for Determining Sparkle," the salient portions of which that are related to PPD measurements are incorporated by reference herein in their entirety. Further, unless otherwise noted, the SMS-1000 system (Display-Messtechnik & Systeme Gmbh & Co. KG) is employed to generate and evaluate the PPD measurements of this disclosure. The PPD measurement system includes: a pixelated source comprising a plurality of pixels (e.g., a Lenovo Z50 140 ppi laptop), wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices m and n; and a diaphragm disposed on the optical path between the pixelated source and the imaging device, wherein the diaphragm has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion. As used herein, all "PPD" and "sparkle" values, attributes and limits are calculated and evaluated with a test setup employing a display device having a pixel density of 140 pixels per inch (PPI) (also referred herein as "$PPD_{140}$").

As generally depicted in FIG. 1, the textured region 30a of the textured, antiglare glass article 100 can be configured to minimize sparkle. In some embodiments, the textured region 30a is configured to minimize sparkle, while maintaining a reduced glare function (e.g., with regard to DOI, as outlined in greater detail later in this disclosure) suitable for display device applications. According to some embodiments, the textured region 30a of the textured, antiglare glass article 100 is configured such that the article is characterized by a sparkle of 3% or less, as measured by a PPD distribution. In other aspects, the textured, antiglare glass articles 100 of the disclosure can be configured with a sparkle of 3% or less, 2.5% or less, 2.0% or less, 1.5% or less, 1% or less, 0.5% or less, and all sparkle levels between these upper limits, as measured by a PPD distribution.

Referring again to the textured, antiglare glass article 100 depicted in FIG. 1, the article can also be configured for optimal antiglare performance, as manifested by low distinctness of image (DOI) values. As used herein, "DOI" is equal to $100*(R_s - R_{0.3°})/R_s$, where $R_s$ is the specular reflectance flux measured from incident light (at 30° From normal) directed onto a textured region of a textured, antiglare glass article of the disclosure and $R_{0.3°}$ is the reflectance flux measured from the same incident light at 0.3° From the specular reflectance flux, $R_s$ (see also FIG. 3A and its corresponding description below). Unless otherwise noted, the DOI values and measurements reported in this disclosure are obtained according to the ASTM D5767-18 Standard Test Method for Instrumental Measurement of Distinctness-of-Image (DOI) Gloss of Coated Surfaces using a Rhopoint IQ Gloss Haze & DOI Meter (Rhopoint Instruments Ltd.). Notably, the textured, antiglare glass articles 100 of the disclosure can exhibit low sparkle (e.g., less than 3%) without significant reductions in antiglare performance, as manifested in low DOI values. In implementations, the textured, antiglare glass articles 100 of the disclosure can be configured with a DOI of 70% or less. In other embodiments, the textured, antiglare glass articles 100 of the disclosure can be configured with a DOI of less than 70%, 65%, 60%, 55%, 50%, 45%, 40%, 35%, 30%, 25%, and all DOI levels between these upper limits.

As used herein, the terms "transmission haze" and "haze" refer to the percentage of transmitted light scattered outside an angular cone of about ±2.5° in accordance with ASTM procedure D1003, entitled "Standard Test Method for Haze and Luminous Transmittance of Transparent Plastics," the contents of which is incorporated by reference herein in its entirety. For an optically smooth surface, transmission haze is generally close to zero. According to implementations of the textured, antiglare glass articles 100 depicted in FIG. 1, the articles can be characterized by a haze of 30% or less. In other implementations, for particular applications, textured, antiglare glass articles 100 consistent with the principles of this disclosure can be fabricated with haze levels as high as 90%, haze levels ranging from 3% to 90%, haze levels from 3% to 30%, and all haze levels between these values.

Referring again to FIG. 1, the glass substrate 10 of the textured, antiglare glass article 100 can be configured with a multi-component glass composition having about 40 mol % to 80 mol % silica and a balance of one or more other constituents, e.g., alumina, calcium oxide, sodium oxide, boron oxide, etc. In some implementations, the bulk composition of the glass substrate 10 is selected from the group consisting of aluminosilicate glass, a borosilicate glass and a phosphosilicate glass. In other implementations, the bulk composition of the glass substrate 10 is selected from the group consisting of aluminosilicate glass, a borosilicate glass, a phosphosilicate glass, a soda lime glass, an alkali aluminosilicate glass, and an alkali aluminoborosilicate glass. In further implementations, the glass substrate 10 is a glass-based substrate, including but not limited to, glass-ceramic materials that comprise a glass component at about 90% or greater by weight and a ceramic component.

In one embodiment of the textured, antiglare glass article 100 depicted in FIG. 1, the glass substrate 10 has a bulk composition that comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio ($Al_2O_3$ (mol %)+$B_2O_3$ (mol %))/Σ alkali metal modifiers (mol %)>1, where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio ($Al_2O$; (mol %)+$B_2O_3$ (mol %)/Σ alkali metal modifiers (mol %)>1, where the modifiers are alkali metal oxides.

In another embodiment of the textured, antiglare glass article 100, as shown in FIG. 1, the glass substrate 10 has a bulk composition that comprises an alkali aluminosilicate glass comprising, consisting essentially of, or consisting of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the glass substrate 10 has a bulk composition that comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+Ca≤10 mol %.

In still another embodiment, the glass substrate 10 has a bulk composition that comprises an alkali aluminosilicate glass comprising, consisting essentially of, or consisting of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2+B_2O_3+CaO$≤69 mol %; $Na_2O+K_2O+B_2O_3+MgO+CaO+SrO$>10 mol %; 5 mol %≤MgO+CaO+SrO≤8 mol %; ($Na_2O+B_2O_3$)—$Al_2O_3$≤2 mol %; 2 mol %≤$Na_2O$—$Al_2O_3$≤6 mol %; and 4 mol %≤($Na_2O+K_2O$)—$Al_2O_3$≤10 mol %.

In other embodiments, the glass substrate 10 has a bulk composition that comprises $SiO_2$, $Al_2O_3$, $P_2O_5$, and at least one alkali metal oxide ($R_2O$), wherein 0.75>[($P_2O_5$ (mol %)+$R_2O$ (mol %))/$M_2O_3$ (mol %)]≤1.2, where $M_2O_3$=$Al_2O_3+B_2O_3$. In some embodiments, [($P_2O_5$ (mol %)+$R_2O$) (mol %))/$M_2O_3$ (mol %)]=1 and, in some embodiments, the glass does not include $B_2O_3$ and $M_2O_3$=$Al_2O_3$. The glass substrate comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass substrate comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass substrate 10 may further comprise at least one alkaline earth metal oxide such as, but not limited to, MgO or CaO.

In some embodiments, the glass substrate 10 has a bulk composition that is substantially free of lithium; i.e., the glass comprises less than 1 mol % $Li_2O$ and, in other embodiments, less than 0.1 mol % $Li_2O$ and, in other embodiments, 0.01 mol % $Li_2O$, and in still other embodiments, 0 mol % $Li_2O$. In some embodiments, such glasses are free of at least one of arsenic, antimony, and barium; i.e., the glass comprises less than 1 mol % and, in other embodiments, less than 0.1 mol %, and in still other embodiments, 0 mol % of $As_2O_3$, $Sb_2O_3$, and/or BaO.

In other embodiments of the textured, antiglare glass article 100 depicted in FIG. 1, the glass substrate 10 has a bulk composition that comprises, consists essentially of or consists of a glass composition Corning® Eagle XG® glass, Corning® Gorilla® glass, Corning® Gorilla® Glass 2, Corning® Gorilla® Glass 3, Corning® Gorilla® Glass 4 or Corning® Gorilla® Glass 5.

According to other embodiments, the glass substrate 10 of the textured, antiglare glass article 100 depicted in FIG. 1 can possess an ion-exchangeable glass composition that is strengthened by either chemical or thermal means that are known in the art. In one embodiment, the glass substrate is chemically strengthened by ion exchange. In this process, metal ions at or near a primary surface 12 and/or primary surface 14 of the glass substrate 10 are exchanged for larger metal ions having the same valence as the metal ions in the glass substrate. The exchange is generally carried out by contacting the glass substrate 10 with an ion exchange medium such as, for example, a molten salt bath that contains the larger metal ion. The metal ions are typically monovalent metal ions such as, for example, alkali metal ions. In one non-limiting example, chemical strengthening of a glass substrate 10 that contains sodium ions by ion exchange is accomplished by immersing the glass substrate 10 in an ion exchange bath comprising a molten potassium salt such as potassium nitrate ($KNO_3$) or the like. In one particular embodiment, the ions in the surface layer of the glass substrate 10 and the larger ions are monovalent alkali metal cations, such as $Li^+$ (when present in the glass), $Na^+$, $K^+$, $Rb^+$, and $Cs^+$. Alternatively, monovalent cations in the surface layer of the glass substrate 10 may be replaced with monovalent cations other than alkali metal cations, such as $Ag^+$ or the like.

In these embodiments of the textured, antiglare glass article 100 depicted in FIG. 1, the replacement of small metal ions by larger metal ions in the ion exchange process creates a compressive stress region 50 in the glass substrate 10 that extends from the primary surface 12 to a depth 52 (referred to as the "depth of layer") that is under compressive stress. It should also be understood that a compressive stress region can be formed in the glass substrate that extends from the primary surface 14 to a depth (not shown in FIG. 1) that is comparable in nature to the compressive stress region 50. More particularly, this compressive stress at the primary surface of the glass substrate is balanced by a tensile stress (also referred to as "central tension") within the interior of the glass substrate. In some embodiments, the primary surface 12 of the glass substrate 10 described herein, when strengthened by ion exchange, has a compressive stress of at least 350 MPa, and the region under compressive stress extends to a depth 52, i.e., depth of layer, of at least 15 μm below the primary surface 12.

Ion exchange processes are typically carried out by immersing the glass substrate 10 in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments, when employed with a glass substrate 10 having an alkali aluminosilicate glass composition, result in a compressive stress region 50 having a depth 52 (depth of layer) ranging from about 10 μm up to at least 50 μm with a compressive stress ranging from about 200 MPa up to about 800 MPa, and a central tension of less than about 100 MPa.

As the etching and leaching processes that can be employed to create the textured region 30a of the textured, antiglare glass article 100, according to some embodiments, can remove alkali metal ions from the glass substrate 10 that would otherwise be replaced by a larger alkali metal ion during an ion exchange process, a preference exists for developing a compressive stress region 50 in the textured glass article 100 after the formation and development of the textured region 30a. In other embodiments, a compressive stress region 50 can be developed in the glass substrate 10 prior to development of the textured region 30a to a depth 52 sufficient to account for some loss in the depth of layer in the region 50 associated with the various treatments associated with forming the textured region 30a, as outlined below.

According to another implementation of the textured, antiglare glass article 100 depicted in FIG. 1, the article can further include an easy-to-clean (ETC) coating (not shown) disposed over the textured region 30a. In most embodiments, the ETC coating is deposited over the textured region 30a such that its surface morphology generally mirrors the underlying morphology of the textured region 30a. In one embodiment, the textured glass article 100a further includes a smudge-resistant fluorine-based ETC coating, deposited on at least a portion of the textured region 30a. In embodiments, the ETC coating comprises at least one amphiphobic substance having fluorine termination groups provide the textured region 30a with amphiphobicity (i.e., hydrophobicity and oleophobicity, or lack of affinity for both oils and water), thus minimizing wetting of the surface by water and/or oils. The fluorine termination groups of the ETC coating are less polar than a surface having —OH termination groups, and therefore minimize hydrogen (i.e., Van der Waals) bonding between particles and liquids. For fingerprint oils and debris associated with fingerprints, bonding—and adhesion—is minimized. Consequently, mass transport of fingerprint oils and debris from the finger of a person to the ETC coating is minimized. In one embodiment, the ETC coating is formed by exchanging the hydrogen found in terminal OH groups on the textured region 30a of the textured glass article 100a with a fluorine-based moiety such as, for example, a fluorine-containing monomer (e.g., a fluorosilane), to form a glass having terminal fluorinated groups.

In another embodiment, an ETC coating of the textured glass article 100a depicted in FIG. 1 comprises a self-assembled monolayer of a fluorine-terminating molecular chain. In yet another embodiment, the ETC coating comprises a thin, fluoro-polymeric coating and, in yet another embodiment, the ETC coating comprises silica soot particles that have been treated to have pendent fluorocarbon groups attached to the soot particles. Such ETC coatings can be applied to the textured region 30a of the textured glass article 100a by dipping, vapor coating, spraying, application with a roller, or other suitable method known in the art. After the ETC coating has been applied, it may be "cured" at temperatures ranging from about 25° C. up to about 150° C. and, in another embodiment, at temperatures ranging from about 40° C. up to about 100° C. Curing times can range from about 1 up to about 4 hours, and may be carried out in an atmosphere containing 40-95% moisture. After curing, the textured glass articles 100a with an ETC coating can be solvent rinsed to remove any unbound coating and air-dried prior to use.

Figure 2:
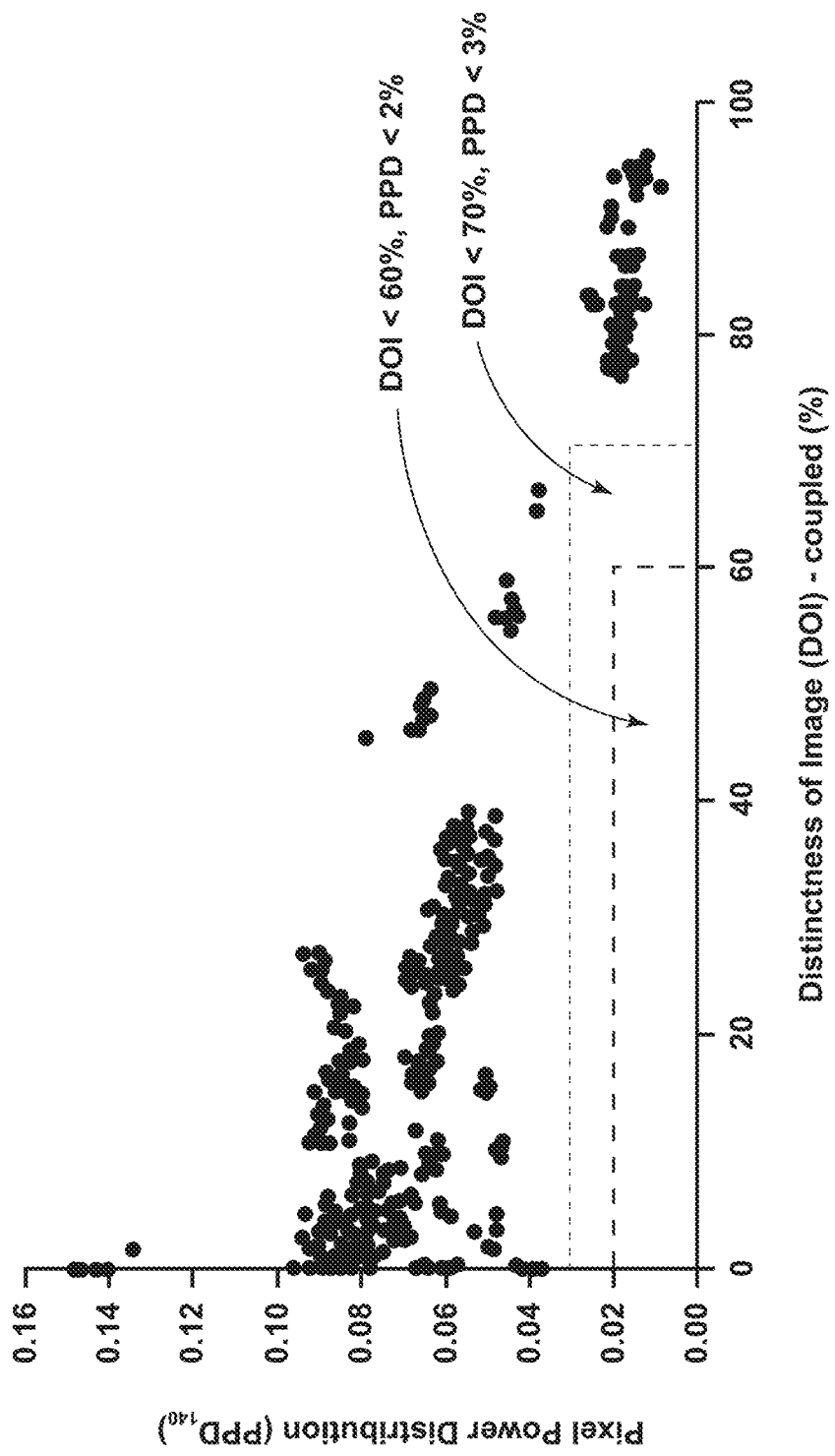
FIG. 2 is a plot of pixel power distribution (PPD) as a function of distinctness of image (DOI) for conventional antiglare glass products and textured, antiglare glass articles, according to aspects of the disclosure.

Referring now to FIG. 2, a plot of pixel power distribution ($PPD_{140}$) as a function of distinctness of image (DOI) is provided for conventional antiglare glass articles. The surfaces of these conventional antiglare glass articles were made through any of the following processes: (1) sand blasting and wet etching (e.g., with HF); (2) wet etching (e.g., with HF, $NH_4F$, etc.); and (3) sol-gel thin film deposition of film from a silane precursor. As outlined earlier, PPD is a measure of sparkle, and the data depicted in FIG. 2 is associated with conventional antiglare glass products. As is evident from FIG. 2, the conventional antiglare products do not exhibit a combination of both low sparkle ($PPD_{140}$) and low DOI values. In particular, none of the conventional antiglare products exhibit sparkle values below 3.7% and DOI values below 77%. In contrast, embodiments of the textured antiglare glass articles 100 of the disclosure (see FIG. 1 and corresponding description) are characterized by sparkle ($PPD_{140}$) of less than 3% and DOI of less than 70%, and fall within the "DOI<70%, PPD<3%" box shown in FIG. 2. Further, embodiments of the textured antiglare glass articles 100 of the disclosure are characterized by sparkle ($PPD_{140}$) of less than 2% and DOI of less than 60%, and fall within the "DOI<60%, PPD<2%" box shown in FIG. 2.

Figure 3A:
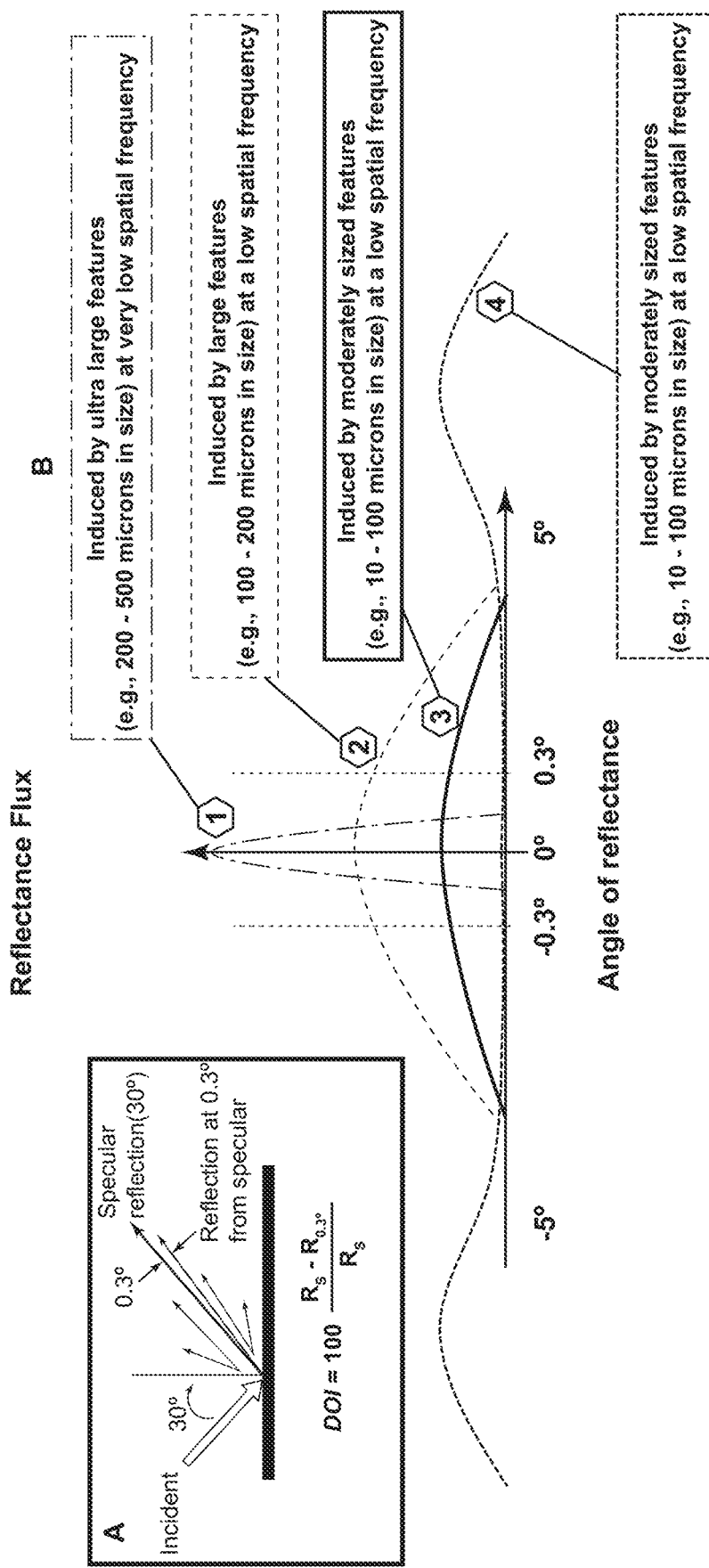
FIG. 3A is a schematic of a textured, antiglare glass article depicting reflectance flux as a function of angle of reflectance, according to an aspect of the disclosure.

Referring now to FIG. 3A, a schematic of a textured, antiglare glass article depicting reflectance flux as a function of angle of reflectance is provided according to an embodiment of the disclosure. As used herein, "DOI" is equal to $100*(R_s - R_{0.3}°)/R_s$, where $R_s$ is the specular reflectance flux measured from incident light (at 30° From normal) directed onto a textured region of a textured, antiglare glass article of the disclosure and $R_{0.3}°$ is the reflectance flux measured from the same incident light at 0.3° From the specular reflectance flux, $R_s$. That is, DOI is measured by determining the relative intensity difference of light at a specular angle relative to incident (i.e., 0°) and relative, reflected angles between 0.2° and 0.4°. As is evident from FIG. 3A, the observed reflectance flux and DOI for profiles 2, 3 and 4 is relatively low in comparison to the reflectance flux and DOI associated with profile 1. Profiles 2, 3 and 4 are indicative of textured surfaces having large and moderately-sized exposed features with average lateral sizes from about 10 microns to 200 microns at relatively low spatial frequencies. In contrast, profile 1 is indicative of a textured surface having very large exposed features with average lateral sizes from about 200 microns to 500 microns. It should also be noted that profile 1 is equally indicative of a textured surface having a high spatial frequency with small average lateral feature sizes. Consequently, it is evident from FIG. 3A that textured surfaces with low spatial frequency regions having moderately and large-sized features, but not ultra large sized features, tend to exhibit low DOI levels. Without being bound by theory, it is believed that the low spatial frequency region 21 of the textured region 30a provides a significant influence in the low DOI levels (<70%) exhibited by the textured, antiglare glass articles 100 of the disclosure (see FIG. 1).

Figure 3B:
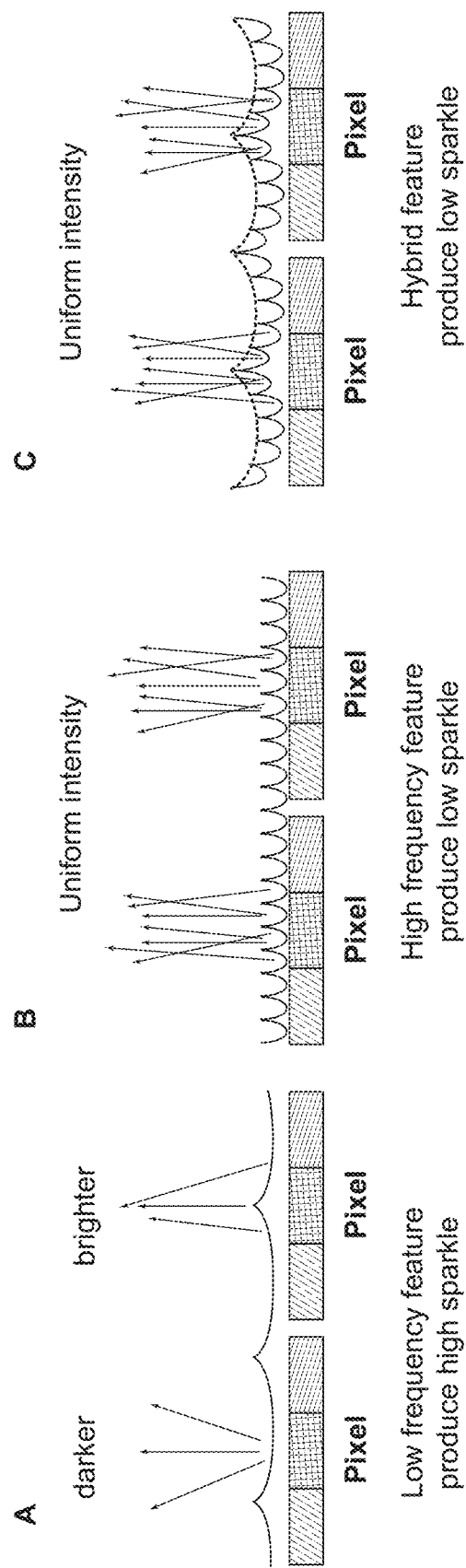
FIG. 3B is a schematic of a textured, antiglare glass article and textured region components of the same article depicting sparkle levels, according to an aspect of the disclosure.

Referring now to FIG. 3B, a schematic of a textured, antiglare glass article and textured region components of the same article are provided, as depicting and showing the impact of glass surface texture on display sparkle levels. In each of the schematics A, B and C, the display pixels shown are representative of red, green and blue sub-pixels (i.e., as viewed from left to right in each schematic). Further, each of these schematics assumes that only the green sub-pixel is illuminated and the schematics A, B and C in FIG. 3B compare the differences of green sub-pixel light uniformity when large, small and hybrid exposed features of a textured region (e.g., textured region 30a) are applied to a glass substrate (e.g., glass substrate 10) residing above the sub-pixels as shown. In schematic A, a textured glass surface whose average lateral feature sizes are large as compared with that of the sub-pixel (e.g., as indicative of a textured region with only a low spatial frequency component) is placed on top of green sub-pixels. The pixel light on the left is diffused and looks darker, and the pixel light on the right is focused and looks brighter to the human eye. Hence, schematic A is indicative of a display that appears non-uniform and granular with high sparkle levels. In schematic B, a textured glass surface whose average lateral features sizes are small as compared with that of the sub-pixel (e.g., as indicative of a textured region with only a high spatial frequency component) is placed on top of green sub-pixels. The pixel light on the left and right looks similar in terms of intensity. Hence, schematic B of FIG. 3B is indicative of a display that appears uniform with low sparkle. But it is also apparent from FIG. 3A that a textured surface with a high spatial frequency region (and no additional low spatial frequency region counterpart), such as depicted in profile 1 of that figure, is characterized by relatively high DOI. Finally, turning to schematic C, a textured glass surface whose average lateral feature sizes are both small and large as compared to that of the sub-pixel (e.g., as indicative of a hybrid textured region 30a of a textured, antiglare glass article 100 with both low and high spatial frequency textured regions 21 and 22) is placed on top of the green sub-pixels. The spatial frequencies of the exposed features determine the direction that the light is scattered from the surface. Further, it is apparent from schematic C of FIG. 3B that the pixels on the left and right have similar uniformity and intensity, i.e., low sparkle.

Figure 4A:
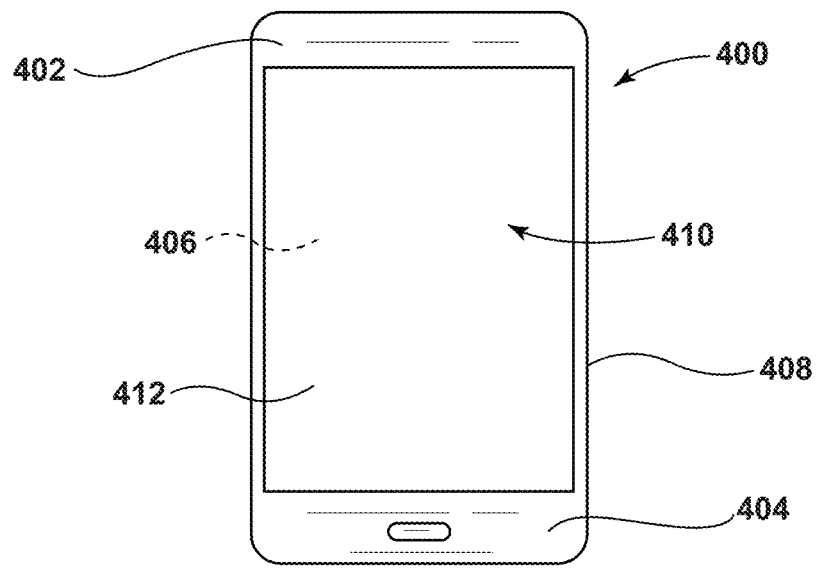
FIG. 4A is a plan view of an exemplary electronic device incorporating any of the articles of the disclosure.
Figure 4B:
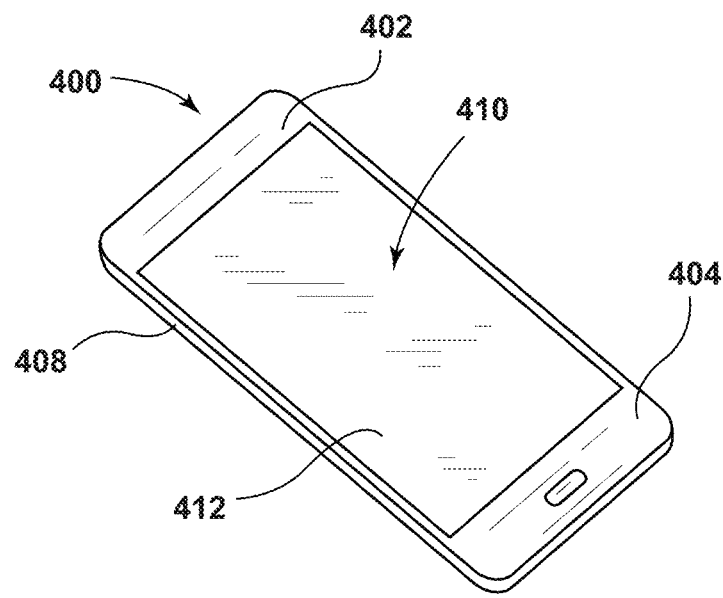
FIG. 4B is a perspective view of the exemplary electronic device of FIG. 4A.

Referring now to FIGS. 4A and 4B, the textured, antiglare glass articles 100 disclosed herein (see FIG. 1) may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass articles disclosed herein, including glass articles 100, is shown in FIGS. 4A and 4B. Specifically, FIGS. 4A and 4B show a consumer electronic device 400 including a housing 402 having front 404, back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In some embodiments, at least one of the cover substrate 412 or a portion of housing 402 may include any of the glass articles disclosed herein.

Figure 5:
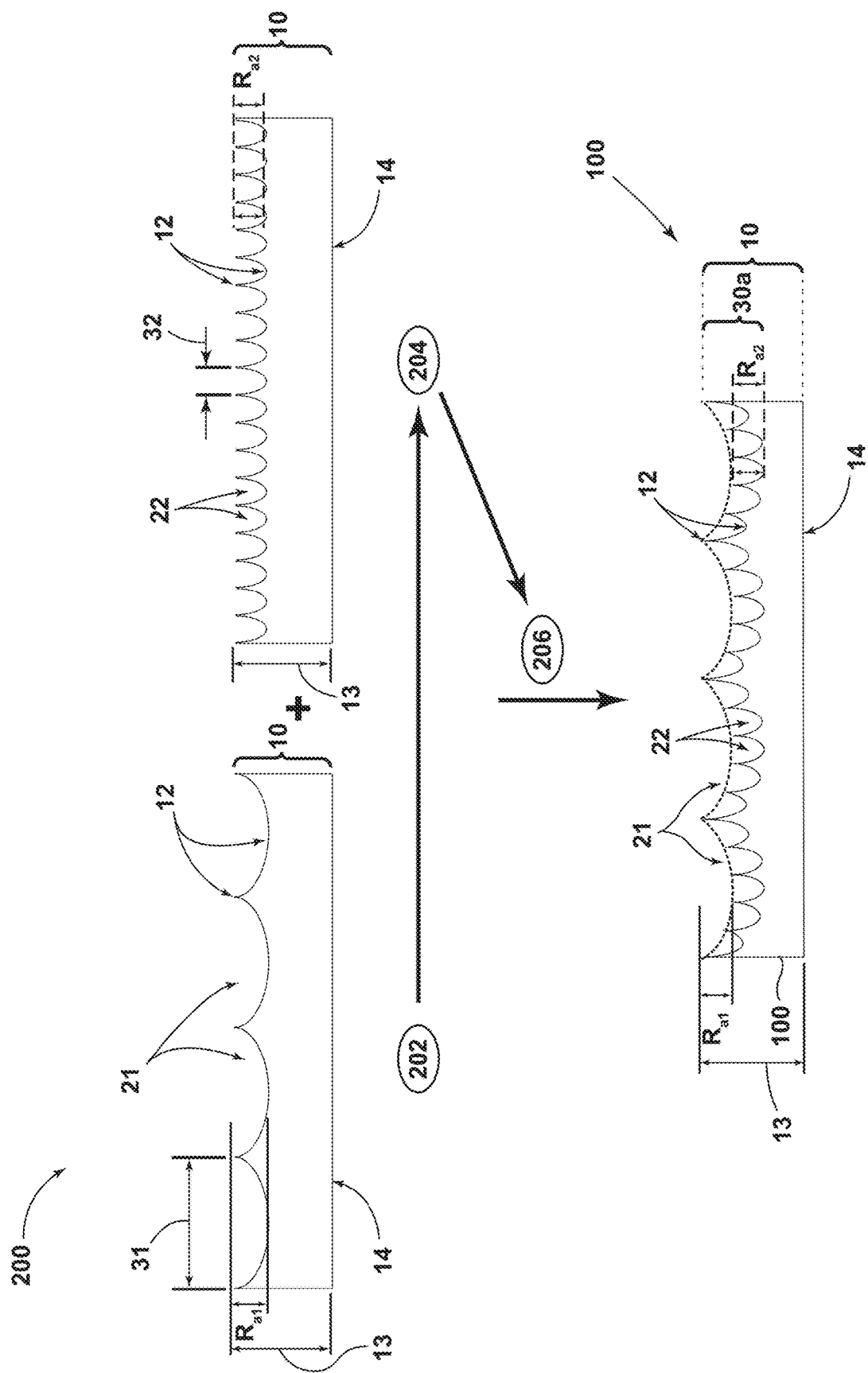
FIG. 5 is a flow chart schematic of a method of making a textured, anti-glare glass article, according to an aspect of the disclosure.

Referring now to FIG. 5, a schematic flow chart is provided that depicts a method 200 of making a textured glass article, e.g., a textured, antiglare glass article 100 (as depicted in FIG. 1). Unless otherwise noted, the like-numbered elements of the textured, antiglare glass article 100 depicted in FIGS. 1 and 5 have the same or substantially similar functions and structures. As shown in FIG. 5, a glass substrate 10 is provided with a primary surface 12, along with an opposing primary surface 14, and is further characterized by a thickness 13. As further shown in FIG. 5, the method 200 includes a step 202 of etching the primary surface 12 of the glass substrate 10 with a first etchant to form a low spatial frequency textured region 21, which can be characterized by an average surface roughness, $R_{a1}$, and an average lateral feature size 31. The step 202 can be conducted with an etching process that employs one or more of a low pH solution as the etchant, sand particles as the etchant and grit as the etchant. For example, step 202 can include etching with a sand blast medium and a low pH solution as the etchant, e.g., in separate, subsequent steps, to generate the low spatial frequency textured region 21.

Referring again to FIG. 5, the method 200 of making a texture glass article further includes a step 204 of etching the primary surface 12 of the glass substrate 10 with a second etchant to form a high spatial frequency textured region 22, which can be characterized by an average surface roughness, $R_{a2}$, and an average lateral feature size 32. The step 204 can be conducted with an etchant having a pH of about 4 or less. Suitable etchants include hydrofluoric acid-free etchants (e.g., citric acid, hydrochloric acid) and hydrofluoric acid-containing etchants. Suitable hydrofluoric acid-free etchants include hydrochloric acid, nitric acid, sulfuric acid, citric acid, ascorbic acid, oxalic acid and acetic acid. According to an embodiment, etching step 204 is conducted at an elevated temperature from above ambient temperature to about 110° C. In some implementations, the etching step 204 is conducted at about 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., and all temperatures between these values. Further, the etching step 204 can be conducted from about 15 minutes to about 100 hours. In some embodiments, the etching step 204 is conducted from about 5 hours to about 30 hours. Suitable concentration levels for hydrochloric acid etchants, according to some implementations, range from about 0.5% to about 15% by weight, e.g., about 0.5%, 1%, 2%, 3%, 4%, 5%, 6%, 7%, 8%, 9%, 10%, 11%, 12%, 13%, 14%, 15%, and all concentrations of hydrochloric acid between these levels. Suitable concentration levels for citric acid etchants, according to other implementations, range from about 1% to 30% by weight, e.g., about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, and all concentrations of citric acid between these levels. Upon completion of the etching step 204, a textured region 30a is formed in the textured glass article (e.g., textured, antiglare glass article 100), as comprising a low spatial frequency textured region 21 and a high spatial frequency textured region 22 (see also FIG. 1). According to some implementations of the method 200, the textured, antiglare glass article 100 formed according to the method includes a low textured region 21 with an average lateral feature size 31 that exceeds an average lateral feature size 32 of the high spatial frequency region 22. Further, each of the textured regions 21 and 22 can comprise a surface roughness (i.e., $R_{a1}$ and $R_{a2}$, respectively) from about 10 nanometers to about 1000 nanometers, or can collectively comprise an average surface roughness ($R_a$) from about 10 nanometers to about 1000 nanometers.

According to another embodiment of the method 200 of making a textured article shown in FIG. 5 (e.g., a textured, antiglare glass article 100 (as depicted in FIG. 1), the etching step 204 can include etching the primary surface 12 of the glass substrate 10 having a thickness 13 with a second etchant having a pH of about 4 or less and an additive salt. As used herein, the term "additive salt" comprises a salt comprising one or more of a multivalent metal cation (e.g., $Al^{3+}$), an ammonium cation (e.g., $NH_4^+$) and a metal cation not present or at a trace abundance in the glass substrate 10 (e.g., $Li^+$ for certain compositions of glass substrate 10). In some embodiments, the additive salt can comprise a multivalent metal ion and/or an ammonium ion, e.g., as selected from the group consisting of $NH_4^+$, $Al^{3+}$, $Fe^{3+}$, $Ca^{2+}$ and $Mg^{2+}$, and a monovalent anion (e.g., a chloride, a fluoride, a hydrogen fluoride). For example, the additive salt can be $NH_4F$, $NaF$, $KF$, $NH_4HF_2$, $NaHF_2$, $KHF_2$, $NH_4Cl$, $AlCl_3$, $FeCl_3$, $CaCl_2$ and $MgCl_2$. In some embodiments, the additive salt can also include salts comprising a cation not present or in a trace abundance within the target glass substrate 10, e.g., $NH_4Cl$, $LiCl$, $CsCl$, etc. According to some embodiments, the etching step 204 is conducted such that the additive salt (in addition to the hydrochloric acid-free etchant) is employed at a concentration from greater than about 0.1M to about 5M. According to some embodiments, the multivalent metal salt is employed in the etching step 204 at a concentration from greater than about 0.1M to about 3M, from about 0.5M to about 2M, from about 0.5M to about 1.5M, and all concentration values between these range endpoints. In some implementations of the etching step 204 employing an additive salt, the etching is conducted at a temperature from about 75° C. to about 110° C., from about 80° C. to about 110° C., from about 85° C. to about 110° C., from about 90° C. to about 110° C., and all temperatures between these range endpoints. Advantageously, the incorporation of the additive salt into the etching step 204 can reduce the etching time needed to develop the desired level of texturing within the high spatial frequency region 22 of the textured region 30a (see also FIG. 1). According to some implementations of the etching step 204 employing an additive salt, the etching can be conducted from about 15 minutes to about 10 hours. In preferred implementations, the etching step 204 can be conducted with an additive salt from about 15 minutes to about 5 hours, from about 30 minutes to about 5 hours, or even from about 30 minutes to 2 hours.

Referring again to the method 200 depicted in FIG. 5, according to some embodiments, the method further includes a removing step (not shown) configured to remove excess etchant and leached substrate constituents from the etching steps 202 and/or 204. That is, after steps 202 and 204 of the method 200, excess etchant from these steps, along with any loose and remnant constituents from the substrate 10, are then removed by rinsing the etchant on the primary surface 12 with deionized water. As would be understood by those with ordinary skill in the field of the disclosure, various mechanical and/or aqueous cleaning approaches can be employed in the removing step to remove excess etchant and leached substrate constituents without materially affecting the surface of the substrate 10.

Still referring to the method 200 depicted in FIG. 5, according to some embodiments, the method further includes a step 206 of treating the primary surface 12 of the substrate 10 with an aqueous solution having a pH of greater than 9. In these embodiments, the treating step 206 assists in the formation of the high spatial frequency region 22 of the textured region 30a of the textured, glass article formed according to the method 200, e.g., textured, antiglare glass article 100 (see also FIG. 1). More particularly, the treating step 206 can be conducted at a temperature above ambient with the high pH aqueous solution (pH>9) after the etching steps 202 and 204. In embodiments, the high pH aqueous solution employed during the step 206 is an aqueous, alkaline solution having a pH that ranges from about 10 to about 13 (e.g., NaOH). According to an embodiment, treating step 206 is conducted at an elevated temperature from above ambient temperature to about 110° C. In some implementations, the treating step 206 is conducted at about 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., and all temperatures between these values. Further, the treating step 206 can be conducted from about 15 minutes to about 100 hours. In some embodiments, the treating step 206 is conducted from about 5 hours to about 30 hours.

EXAMPLES

The following examples describe various features and advantages provided by the disclosure, and are in no way intended to limit the invention and appended claims.

Example 1

Figure 6A:
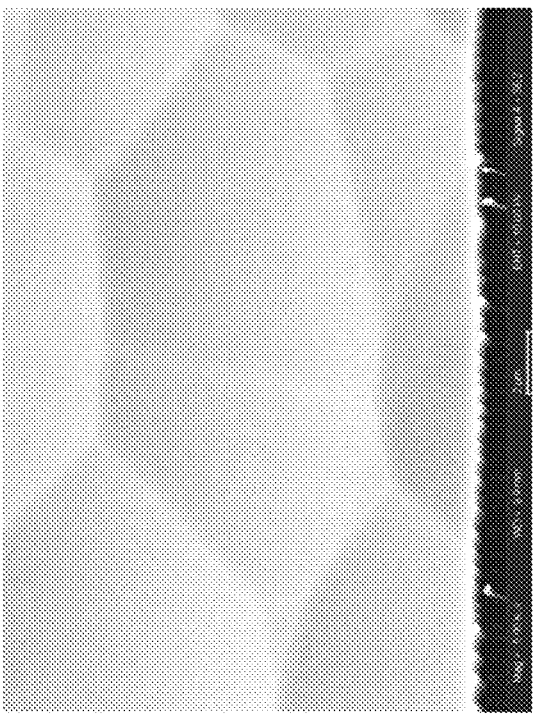
FIGS. 6A and 6B are scanning electron microscope (SEM) micrographs of low and high spatial frequency textured regions, respectively, of a textured, antiglare glass article, according to aspects of the disclosure.

Textured, antiglare glass samples of Corning® Gorilla® Glass 3 having a thickness of about 0.6 mm were prepared according to the following method, as consistent with the principles of the disclosure. In particular, the samples were subjected to a sand blasting and etching process (step 1) to form a low spatial frequency textured region in the primary surface of the glass substrate. Some of the samples (Ex. 1A) were subjected to an etching process consistent with the principles of the disclosure to obtain a transmitted haze of about 6% to 7%. The remaining samples (Ex. 1B) were etched according to an etching process consistent with the principles of the disclosure to obtain a transmitted haze of about 19% to 20%. As is evident from the SEM micrograph of FIG. 6A, the low spatial frequency textured regions in all of these samples (Exs. 1A and 1B) can be characterized by an average lateral feature size of about 15 to 20 microns. The DOI of all of these samples (Ex. 1A and 1B) was <50%.

Further, the PPD of the first group of samples (Ex. 1A) was about 7.6% and the PPD of the second group of samples (Ex. 1B) was about 5.6%. In addition, all of the samples were measured with a thickness of about 0.55 mm after completion of the sand blasting and etching step.

Figure 6B:
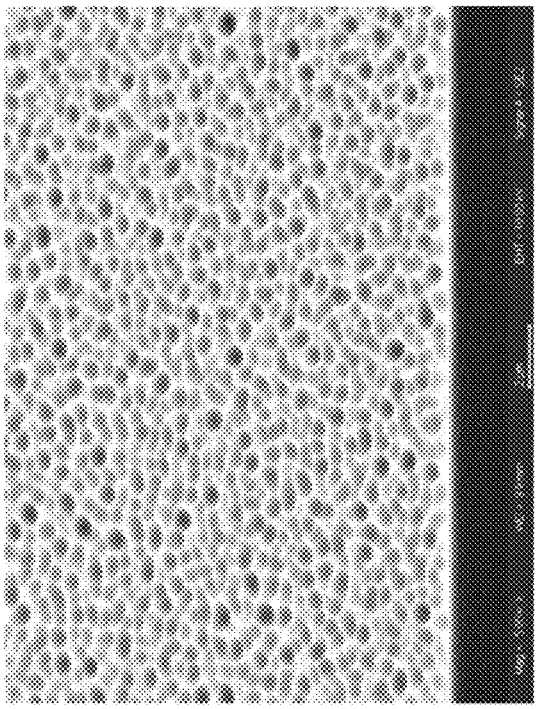

After completion of the sand blasting and etching process (step 1 above), the samples were subjected to an etching treatment with a low pH etchant and an additive salt (step 2), followed by a high pH treatment (step 3), to form a high spatial frequency textured region in the primary surface of the glass substrate. Accordingly, the resulting substrates have a textured region that includes a high spatial frequency textured region in addition to the low spatial frequency textured region. In particular, the low spatial frequency textured region of the samples from step 1 were further treated with a solution of 10 wt. % HCl and 16.2 wt. % $FeCl_3$ at 95° C. for 2.17 hours (Ex. 1A1 and 1B1), 2.75 hours (Ex. 1A2 and 1B2) or 3.42 hours (Ex. 1A3 and 1B3). After the low pH treatment, all of the samples were further subjected to a high pH treatment with an NaOH solution at 60° C. for 10 minutes (step 3). After completion of steps 2 and 3, all of the samples (Exs. 1A1-A3 and 1B1-B3) exhibited a high spatial frequency textured region having exposed features with an average lateral feature size of 0.5 microns to 2 microns, as further evidenced by the SEM micrograph in FIG. 6B. Note that the SEM micrograph of the samples in FIG. 6B is of control samples (Exs. 1D1-D3) subjected to only steps 2 and 3, but not step 1.

The samples produced in this example were evaluated for DOI and PPD. Table 1 summarizes the results of this assessment, including the process conditions for the samples of this example. In addition, Table 1 includes the DOI and PPD results for a set of control samples, Ex. 1C1, as subjected to no etching and treatments associated with steps 1-3; and a set of control samples, Exs. 1D1-D3, as subjected to the etching and treatments of steps 2 and 3 and no exposure to the etching of step 1. As is evident from Table 1, the samples including only a low spatial frequency textured region (Exs. 1A and 1B) exhibited high sparkle (i.e., PPD of 7.6 and 5.6%, respectively) and low DOI (i.e., 6.38% and 44.01%, respectively). Further, the samples that include only a high spatial frequency textured region (Exs. 1D1-D3) exhibited low sparkle (i.e., PPD from 0.4 to 0.6%) and high DOI (i.e., from 99.35% to 99.79%). Conversely, the samples with a hybrid textured region containing low and high spatial frequency textured regions (Exs. 1A1-A3 and 1B1-B3) exhibited low sparkle (i.e., PPD from 0.7% to 6.2%) and low DOI (i.e., about 0%).

TABLE 1

| | | | Optical properties of hybrid textured region | | |
|---|---|---|---|---|---|
| Sample (Ex.) | Haze after step 1, low spatial frequency textured region (%) | Etch time in step 2, high spatial frequency texture region (hrs) | Haze after steps 2 and 3 (%) | $PPD_{140}$ after steps 2 and 3 (%) | DOI-coupled, after steps 2 and 3 (%) |
| 1C1 | 0.03 | 0 | 0.0 | 0.5 | 0.00 |
| 1D1 | 0.04 | 2.17 | 7.7 | 0.6 | 99.79 |
| 1D2 | 0.03 | 2.75 | 23.6 | 0.4 | 99.75 |
| 1D3 | 0.04 | 3.42 | 41.1 | 0.5 | 99.35 |
| 1A | 6.68 | 0 | 23.6 | 7.6 | 6.38 |
| 1A1 | 6.52 | 2.17 | 36.8 | 6.2 | 0.00 |
| 1A2 | 6.26 | 2.75 | 55.5 | 3.2 | 0.00 |
| 1A3 | 6.33 | 3.42 | 65.4 | 1.4 | 0.00 |
| 1B | 19.6 | 0 | 36.0 | 5.6 | 44.01 |
| 1B1 | 19.1 | 2.17 | 50.3 | 4.3 | 0.00 |
| 1B2 | 19.7 | 2.75 | 64.8 | 2.4 | 0.00 |
| 1B3 | 20.0 | 3.42 | 74.9 | 0.7 | 0.00 |

Figure 6C:
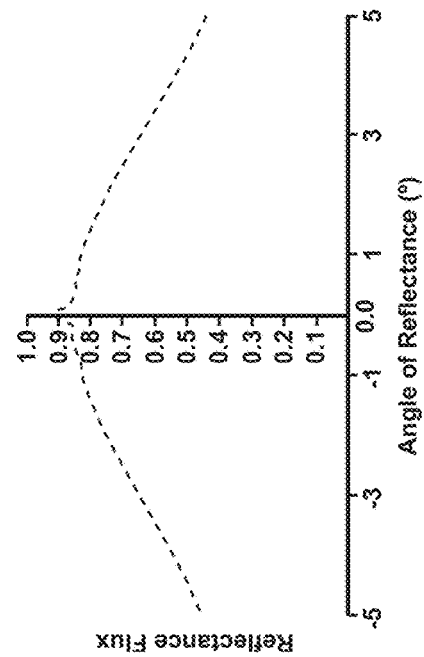
FIGS. 6C and 6D are angular reflectance distributions of low and high spatial frequency textured regions, respectively, of a textured, antiglare glass article, according to aspects of the disclosure.
Figure 6D:
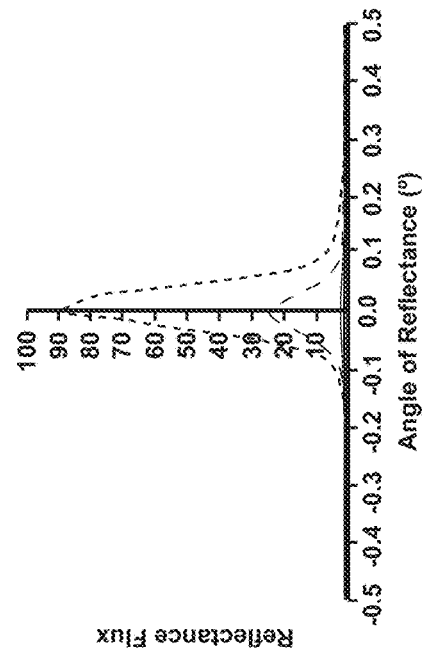

Referring now to FIGS. 6C and 6D, angular reflectance distributions of low and high spatial frequency textured regions, respectively, of textured, antiglare glass articles of this example are provided. In particular, FIG. 6C is the angular reflectance distribution for the samples shown in FIG. 6A having a low spatial frequency textured region (Exs. 1A and 1B). As is evident from FIG. 6C, these samples exhibited low DOI (i.e., 6.38% and 44.01%, respectively). With regard to FIG. 6D, this plot shows the angular reflectance distribution for the samples shown in FIG. 6B having a high spatial frequency textured region (Exs. 1D1-D3). As is evident from FIG. 6D, these samples exhibited high DOI (i.e., near 100%).

Figure 7A:
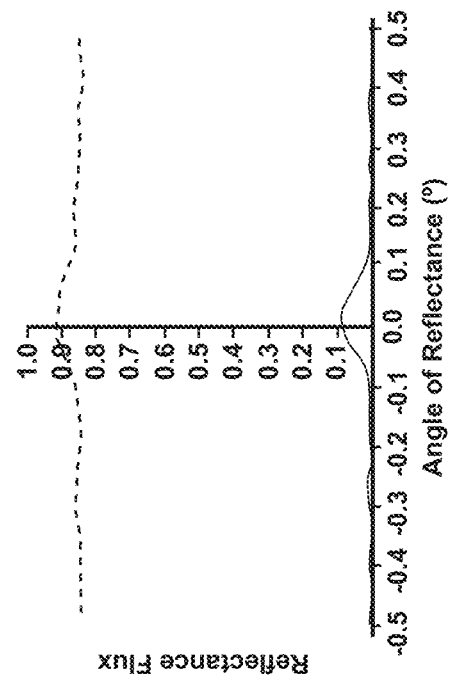
FIG. 7A is an angular reflectance distribution from −5° to +5° of a low spatial frequency textured region and a hybrid of low and high spatial frequency textured regions of textured, antiglare glass articles, according to aspects of the disclosure.
Figure 7B:
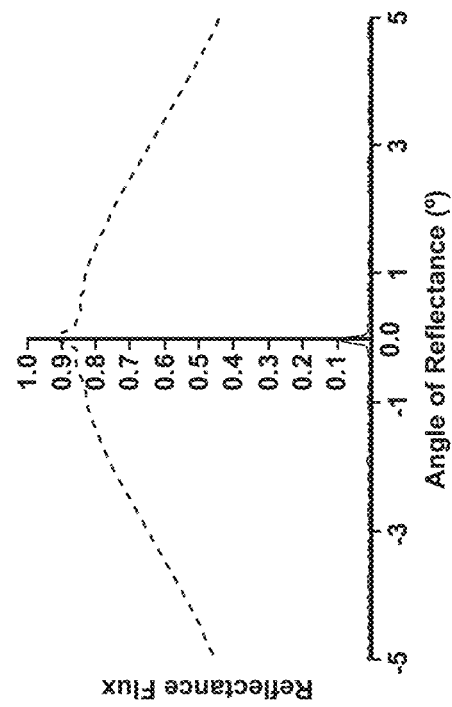
FIG. 7B is the angular reflectance distribution of FIG. 7A, as enlarged to a smaller angle range from −0.5° to +0.5°, according to aspects of the disclosure.

Referring now to FIG. 7A, an angular reflectance distribution from −5° to +5° of textured, antiglare glass samples having both low and high spatial frequency textured regions (Exs. 1A1-A3 and 1B1-B3) are provided. Further, FIG. 7B is the angular reflectance distribution of FIG. 7A, as enlarged to a smaller angle range from −0.5° to +0.5°. As is evident from these figures, the samples with a hybrid textured region containing low and high spatial frequency textured regions exhibited low DOI (i.e., about 0%). In addition, the results from Table 1 indicate that these samples also exhibited low sparkle; accordingly, the textured, antiglare glass articles of this example exhibit a combination of low sparkle (e.g., <3%) and low DOI (e.g., <70%).

One skilled in the art will readily appreciate that when measuring the surface roughness of the aforementioned glass article one may utilize two surface texture metrology ISO standards as follows: (1) ISO 4287:1997 "Geometrical Product Specifications (GPS)—Surface texture: Profile Method—Terms, definitions and surface texture parameters", published April 1997, 25 pages; and (2) ISO 4288: 1996 Geometrical Products Specifications (GPS)—Surface texture: Profile method-Rules and procedures for the assessment of surface texture", published August 1996, 8 pages (the contents of these documents are hereby incorporated herein by reference for all purposes). The feature size can be defined as the correlation length ($L_c$), which is a measure of the length over which the pattern can be statistically predicted based on the current position and height (see ISO 4287 and 4288 standards for more details). Further, when measuring the surface roughness of the aforementioned glass article, one may, based on the feature size, select a specific instrument such as Atomic Force Microscopy (AFM) or Zygo to make the surface roughness measurement. In practice, an initial microscopy estimate of the feature size is often utilized to select the appropriate instrument, based on its resolution capabilities, and this selection is confirmed utilizing the reported correlation length. For example, AFM may be utilized to make the surface roughness measurement for 10 nm to 10 um feature sizes. Zygo may be utilized to make the surface roughness measurement for 10 um and larger feature sizes. Sampling length is defined as being 10*feature size, which is then used to determine the upper cutoff spatial frequency λc=1/(sampling length) and the average roughness Ra of a surface (see ISO 4287 and 4288 standards for more details).

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass article, comprising:
   a glass substrate comprising a thickness and a primary surface; and
   a textured region defined by a plurality of features at the primary surface,
   wherein the textured region comprises a low spatial frequency region and a high spatial frequency region substantially superimposed within the low spatial frequency region,
   wherein the features of the low spatial frequency region comprise an average lateral feature size that exceeds an average lateral feature size of the features of the high spatial frequency region, and
   wherein the average lateral feature size of the low spatial frequency region is larger than the average lateral feature size of the high spatial frequency region by a factor between 1.5 and 100.

2. The glass article according to claim 1, wherein the average lateral feature size of the low spatial frequency region is larger than the average lateral feature size of the high spatial frequency region by a factor between 3.5 and 15.

3. The glass article according to claim 1, wherein the textured region comprises a surface roughness (Ra) from about 10 nm to about 1000 nm.

4. The glass article according to claim 3, wherein the surface roughness (Ra) of the textured region comprises a low spatial frequency component ($R_{a1}$) in the low spatial frequency region and a high spatial frequency component ($R_{a2}$) in the high spatial frequency region, wherein the average surface roughness ($R_{a1}$) of the low spatial frequency region is between 50 nanometers and 1000 nanometers, and wherein the average surface roughness ($R_{a2}$) of the high spatial frequency region is between 10 nanometers and 200 nanometers.

5. The glass article according to claim 1, wherein the average lateral feature size of the low spatial frequency region is 5 μm or larger and the average lateral feature size of the high spatial frequency region is less than 5 μm.

6. The glass article according to claim 1, wherein the average lateral feature size of the low spatial frequency region is 10 μm or larger and the average lateral feature size of the high spatial frequency region is less than 5 μm.

7. The glass article according to claim 1, wherein the average lateral feature size of the low spatial frequency region is 20 μm or larger and the average lateral feature size of the high spatial frequency region is less than 5 μm.

8. The glass article according to claim 1, wherein the glass substrate comprises a composition selected from the group consisting of an aluminosilicate glass, a borosilicate glass, a phosphosilicate glass, a soda lime glass, an alkali aluminosilicate glass, and an alkali aluminoborosilicate glass.

9. The glass article according to claim 1, wherein the glass substrate further comprises a compressive stress region that extends from the primary surface to a selected depth.

10. The glass article according to claim 1, wherein the glass article comprises a sparkle of less than 3% as measured by pixel power distribution (PPD), and a distinctness of image (DOI) of less than 70%.

11. The glass article according to claim 1, wherein the glass article comprises a sparkle of less than 2% as measured by pixel power distribution (PPD), and a distinctness of image (DOI) of less than 60%.

12. The glass article according to claim 1, wherein the glass article comprises a sparkle of less than 1% as measured by pixel power distribution (PPD), and a distinctness of image (DOI) of less than 50%.

13. The glass article according to claim 1, wherein the glass article comprises a sparkle of less than 1% as measured by pixel power distribution (PPD).

14. The glass article according to claim 1, wherein the plurality of features of both the low spatial frequency region and the high spatial frequency region are substantially concave, and adjacent features of the low spatial frequency region intersect to form a peak.

15. The glass article according to claim 1, wherein the glass article comprises a sparkle of less than 3% as measured by pixel power distribution (PPD), a distinctness of image (DOI) of less than 40%, and a haze of 3-30%.

16. A glass article, comprising:
    a glass substrate comprising a thickness and a primary surface; and
    a textured region defined by a plurality of features at the primary surface,
    wherein the textured region comprises a low spatial frequency region and a high spatial frequency region substantially superimposed within the low spatial frequency region,
    wherein the features of the low spatial frequency region comprise an average lateral feature size that exceeds an average lateral feature size of the features of the high spatial frequency region,
    wherein the textured region comprises a surface roughness (Ra) from 10 nm to 1000 nm, and
    wherein the average lateral feature size of the low spatial frequency region is larger than the average lateral feature size of the high spatial frequency region by a factor between 3.5-15; and
    wherein the average lateral feature size of the low spatial frequency region is 20 μm or larger and the average lateral feature size of the high spatial frequency region is less than 5 μm.

17. The glass article according to claim 16, wherein the glass article comprises a sparkle of less than 3% as measured by pixel power distribution (PPD), a distinctness of image (DOI) of less than 40%, and a haze of 3-30%.

18. A method of making a glass article, comprising:
    a first etching of a primary surface of a glass substrate with a first etchant to form a low spatial frequency textured region defined by the primary surface; and
    a second etching of the primary surface of the glass substrate with a second etchant to form a high spatial frequency textured region defined by the primary surface and substantially superimposed within the low spatial frequency textured region, wherein the low spatial frequency textured region comprises an average lateral feature size that exceeds an average lateral feature size of the high spatial frequency textured region, and wherein the average lateral feature size of the low spatial frequency region is larger than the average lateral feature size of the high spatial frequency region by a factor between 1.5 and 100.

19. The method according to claim 18, wherein the average lateral feature size of the low spatial frequency region is larger than the average lateral feature size of the high spatial frequency region by a factor between 3.5 and 15.

20. The method according to claim 18, wherein the first etchant comprises a sand blast etchant and a low pH solution etchant.

21. The method according to claim 18, wherein the first etchant comprises hydrochloric acid and a fluoride salt, wherein the fluoride salt comprises one or more salts selected from the group consisting of ammonium fluoride, sodium fluoride, potassium fluoride, ammonium difluoride, sodium difluoride, and potassium difluoride.

22. The method according to claim 18, wherein the second etching is conducted at an etching temperature above ambient temperature and the second etchant is a solution with a pH of less than 4.

23. The method according to claim 18, wherein the second etchant comprises an acid selected from the group consisting of hydrochloric acid, nitric acid, sulfuric acid, citric acid, ascorbic acid, oxalic acid and acetic acid.

24. The method according to claim 18, wherein the second etchant comprises one or more salts comprising a multivalent metal cation.

25. The method according to claim 18, wherein the etching temperature of the second etching is from 60° C. to 100° C.

26. The method according to claim 18, further comprising:

treating the primary surface of the glass substrate with an aqueous solution having a pH of greater than 9 at a temperature above ambient temperature, the treating step conducted after the first and second etching steps.

* * * * *